Dec. 27, 1938.   G. L. CALLERY   2,141,374

HORN BUTTON ATTACHMENT

Filed Sept. 1, 1937

George L. Callery INVENTOR.

BY John L. Seymour
ATTORNEYS.

Patented Dec. 27, 1938

2,141,374

UNITED STATES PATENT OFFICE 2,141,374

HORN BUTTON ATTACHMENT

George L. Callery, New Castle, Del.

Application September 1, 1937, Serial No. 161,925

3 Claims. (Cl. 74—484)

This invention relates to an attachment for horn buttons of automobiles.

The horn button of the automobile is usually located at the top of the steering column. In order to blow the horn the driver must remove his hand from the steering wheel. In cases of emergency which require an audible signal, the driver is frequently compelled to give complete attention to the handling of the car, and the pressing of the horn button is made impossible or is attended by an increase of risk. In order to overcome this difficulty some manufacturers have equipped the steering column with a horn blowing wheel within the steering wheel. Such devices are comparatively expensive, interfere to some extent with the handling of the steering wheel, and cause unintentional horn blowing when there is accidental contact of the hands or clothing with the horn wheel.

In 1923 it was proposed to equip an automobile horn button with an extension provided with a cup which covered the horn button. The device was made of metal, it could not be firmly or permanently attached to any button, could not be attached to the flat horn buttons which are now in use, and its operation depended upon the sides of a metal cup gripping the side of a horn button. A device of similar type is shown in the patent identified as McGahey, 1,478,287, December 18, 1923.

It is an object of this invention to provide an automobile horn button of any type with an extension which can be operated by the thumb or fingers of the driver without removing the hand from the steering wheel. Another object of the invention is to make a permanent connection between an extension arm and a horn button, which will permit the arm to be moved to any satisfactory position. Another object of the invention is to make a horn button extension of durable but inexpensive construction. Other objects of the invention will be in part apparent and in part hereinafter set forth.

The objects of the invention are accomplished, generally speaking, by a device which comprises in its preferred form a rubber suction disk for attachment to the horn button of an automobile, an arm attached thereto, and means for connecting the arm with the surface of the disk at a distance from the place of connection. By this means there is provided a lever of the first or third classes with a fulcrum and point of application.

Figure 1:
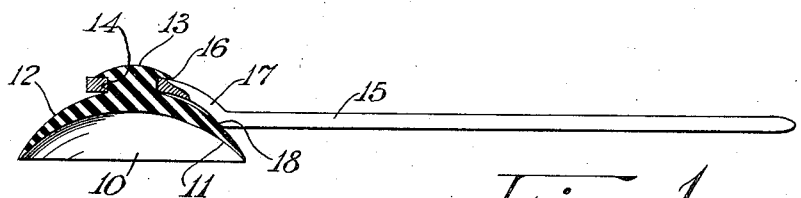
Figure 2:
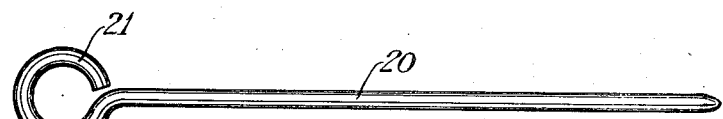
Figure 3:
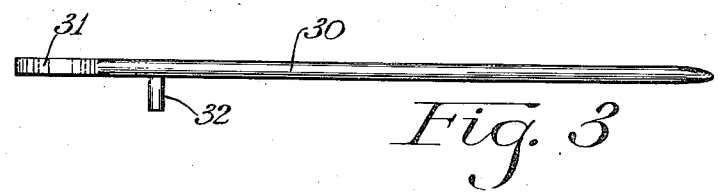
Figure 4:
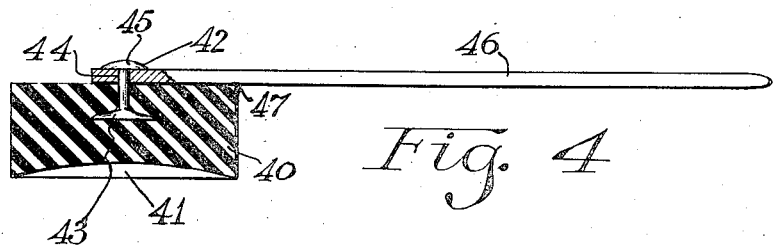

In the accompanying drawing: Figure 1 is a view partly in section through a preferred form of the device. Figure 2 is a plan view of a different type of lever arm. Figure 3 is a horizontal view of another form of lever arm. Figure 4 is a view partly in section showing a modified attaching means, modified suction disk, and modified arm.

Referring to the numerals on the drawing, 10 is a suction disk having inner curvilinear face 11 and outer face 12; 13 is a button integral with the central portion of the device; 14 is a shank connecting the button with the body of the disk; 15 is a lever arm; 16 is a hole in the lever arm, through which the button has been forced. The hole may be slightly smaller than the shank, so that the shank 14 will be held in compression. The lever arm may be slightly thicker than the length of the shank, so that it will be held in compression by the button and the body of the disk; 17 is an off-set in the arm 15 which makes contact at a distance from attaching button 13 with point 18 on the surface of the disk.

The device is applied by pressure, and the connection may be made permanent by cementing it onto the horn button. One method of applying the arm is to coat the surface of the horn button and the surface 10 of the suction disk with cement, and press them into firm contact. After the cement has set, a permanent connection is established, the disk becomes in effect a permanent part of the horn button, and the arm 15 can be turned about the shank 14 to any position selected by the driver. The lever arm 15 can be made of rigid material such as iron or artificial resin, or of slightly bendable material such as brass, some types of steel, or hard rubber so that it can be bent into proximity to the rim of any wheel.

In operating the device the driver presses the lever arm 15 which operates through the point of contact 18 and the body of the disk to actuate the horn button. In this operation the function of a lever of the third class is observable, the point 16 being the fulcrum and point 18 the point of actuation. In connection with horn buttons operating about a central pivot, the point of contact 18 would also act to some extent as the fulcrum of a lever of the first class.

The device is not limited in use to horn buttons but may be applied to any object whose operation can be improved by the application of the principles of a lever.

Many modifications of the invention are possible without departing from the scope thereof. For example, it would be possible to leave a space between the off-set portion of the device and the surface of the disk, but to do so would be inefficient, requiring the driver to depress the lever a certain distance before exerting pressure on the horn button.

The arm 15 can be modified as shown in Figures 2 and 3. In Figure 2 is shown an arm 20 having an off-set as shown in Figure 1 but made from a rod or wire with a looped end 21. In Figure 3 a substantially flat arm 30 having a hole 31 for the reception of the shank of the button is provided with a depending member 32, designed to make contact with the surface of the disk. In Figure 4 are shown several modifications of the idea. In this figure 40 is a block of rubber or similar material; 41 is a curved face on said block forming a suction surface for contact with a horn button; 42 is a rivet having a head 43 molded in the block 40, a shank 44 projecting through the arm and a head 45 which holds the arm 46 in place. In this device the arm is a substantially flat piece of suitable material having a hole for the reception of the rivet 42. The function of the lever is still observable. The head of the rivet may be considered the fulcrum and the point 47 the point of actuation. The motion of the lever arm 46 is transmitted through the block 40 from the point 47 to the surface of the horn button. The means of transmitting the motion of the arm to the horn button here is the reverse of that shown in Figure 3: In Figure 3 the arm is extended down to meet the disk, while in Figure 4 the disk is extended up to meet the arm.

The advantages of the construction over the devices of the prior art are many: The device fits any horn button and can be attached thereto by a substantially permanent connection. The device can be manufactured at very low cost, the attaching disk being molded out of a suitable grade of rubber, composition, or other suitable material, and the arm being stamped out of suitable sheet metal. The arm and disk are easily assembled and, when assembled, are a substantially permanent unit.

As many apparently widely different embodiments of this invention may be made without departing from the spirit and scope thereof, it is to be understood that I do not limit myself to the specific embodiments thereof except as defined in the appended claims.

I claim:

1. An attachment for horn buttons comprising a compressible rubber suction disk, a flexible button having an undercut shank integral with the crown of said disk, and a relatively rigid arm enclosing said shank and having an off-set portion touching said disk.

2. An attachment for horn buttons comprising a suction disk, a button having an undercut shank integral with the crown of said disk, and an arm enclosing said shank and having an off-set portion touching said disk.

3. An actuator for buttons which can be operated by tilting which comprises a flexible cup for attachment to a said button, an attaching means projecting from the crown of said cup, and an arm attached thereto contacting the cup near the periphery thereof.

GEORGE L. CALLERY.